United States Patent [19]

Müller et al.

[11] 4,418,030

[45] Nov. 29, 1983

[54] PROCESS FOR THE PRODUCTION OF GRANULATES OF ORGANIC SUBSTANCES PRESENT IN THE FORM OF A MELT

[75] Inventors: Ernst-Willi Müller; Claus Rathjen, both of Leverkusen, Fed. Rep. of Germany

[73] Assignee: Bayer Aktiengesellschaft, Leverkusen, Fed. Rep. of Germany

[21] Appl. No.: 330,880

[22] Filed: Dec. 15, 1981

[30] Foreign Application Priority Data

Dec. 24, 1980 [DE] Fed. Rep. of Germany ....... 3049196

[51] Int. Cl.³ .............................................. B29B 1/02
[52] U.S. Cl. .................................. 264/142; 264/143; 264/330; 544/135
[58] Field of Search ................ 264/140–143, 264/237, 330; 425/204–205; 544/135

[56] References Cited

U.S. PATENT DOCUMENTS

| | | | |
|---|---|---|---|
| 1,972,918 | 9/1934 | Bunbury et al. | 544/135 |
| 2,730,526 | 1/1956 | Kinstler | 544/135 |
| 2,857,624 | 10/1958 | Hanzel et al. | 264/141 |
| 3,078,258 | 2/1963 | Harmon | 544/135 |
| 3,144,652 | 8/1964 | D'Amico | 544/135 |
| 3,357,957 | 12/1967 | Bromby et al. | 544/135 |
| 3,436,449 | 4/1969 | Treu et al. | 264/141 |
| 3,527,713 | 9/1970 | Haynes et al. | 264/143 |
| 3,952,080 | 4/1976 | Backlund et al. | 264/143 |
| 3,988,401 | 10/1976 | Kasting et al. | 264/140 |
| 4,182,873 | 1/1980 | Janin | 544/135 |

FOREIGN PATENT DOCUMENTS

50-19582 7/1975 Japan ................................. 264/143

OTHER PUBLICATIONS

G. Matz, "Kristallisation aud Schmelzen", Chem.-Ing.-Techn. 52, (1980), No. 7, pp. 570–575.
H. Herrmann, "Schneckenmasch. i. d.Verfahrenstechn.", Springer-Verl., (1972), pp. 14–16, 120–125.
J. Guzman, "Polymorphism in the 2-(4-Morpholinothio)benzothiazole", J. Heterocyclic Chem., vol. 15, pp. 1531–1533, (1978).

*Primary Examiner*—Jeffery R. Thurlow
*Attorney, Agent, or Firm*—Connolly and Hutz

[57] ABSTRACT

The organic substance present in the form of a melt is cooled below its solidification point in a twin-screw extruder so that it crystallizes out. The crystallized material is then extruded through a breaker plate at the end of the screw extruder and further cooled. It is essential that the temperature prevailing in the screw extruder, its rotational speed and the temperature of the breaker plate should be adjusted such that from 70% to 99.5% and preferably from 95 to 99.5% of the material has solidified by the time it reaches the end of the screw, the non-crystallized liquid residue only crystallizing out during the subsequent cooling operation. Accordingly, a small residue of melt is present during extrusion through the breaker plate. In addition, extrusion is facilitated if the breaker plate is kept at a temperature in the vicinity of the melting point of the material in question.

7 Claims, 1 Drawing Figure

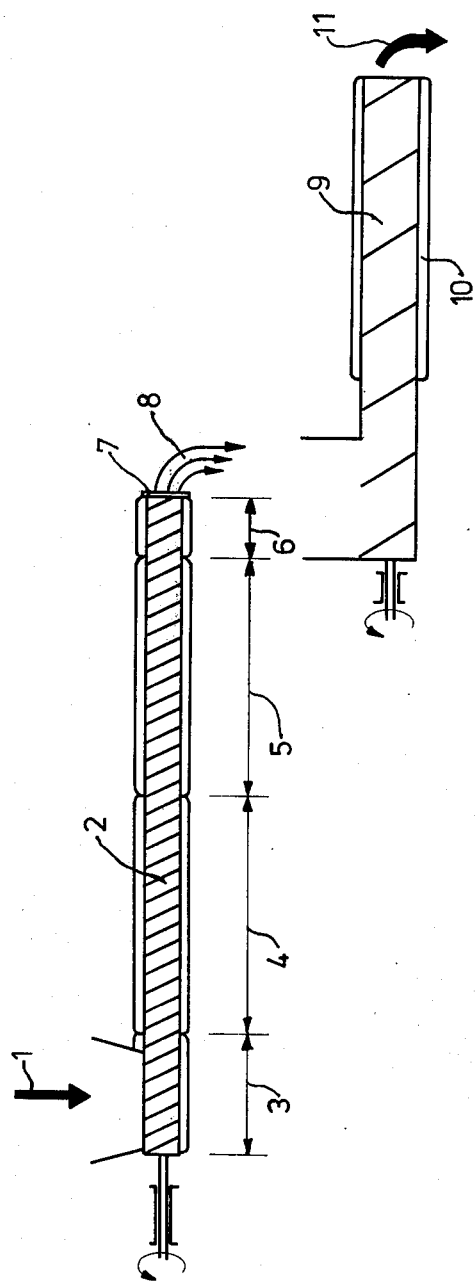

PROCESS FOR THE PRODUCTION OF GRANULATES OF ORGANIC SUBSTANCES PRESENT IN THE FORM OF A MELT

This invention relates to the production of granulates of organic substances present in the form of a melt by a process comprising low-temperature crystallization in a twin-screw extruder, extrusion through a breaker plate at the end of the extruder and cooling of the extruded product.

Cooling belts preceded by a pelletising machine, as described, for example, in the Article by G. Matz in Chem. Ing. Techn. 52 (1980), No. 7, are normally used for crystallizing and forming chemical materials. In the case of rubber chemicals, however, their internal structure (large crystals) makes it difficult to work the pellets thus produced into the rubber mixtures.

It is possible to produce a grain mixture, which although easy to work into the rubber, has a very wide grain size distribution and gives off considerable quantities of unwanted dust using crystallization screws with open product discharge, of the type described in detail by H. Hermann in "Schneckenmaschinen in der Verfahrenstechnik (Screw Extruders in Process Technology)" (Springer-Verlag, 1972). However, a product which does not give off any dust is absolutely essential for reasons of industrial hygiene.

Accordingly, the object of the present invention is to enable organic chemicals to be converted by the crystallization process described hereinbefore into a low-dust, readily meterable, thoroughly crystallized, transportable and mixable form.

According to the invention, this object is achieved in that the temperature prevailing in the screw extruder, its rotational speed and the temperature of the breaker plate at the end of the extruder are adjusted such that from 70 to 99.5% and preferably from 95 to 99.5% of the material has solidified by the time it reaches the end of the extruder, the material remaining in the liquid phase only crystallizing out during the subsequent cooling operation. Accordingly, the material still contains a small residue of melt as it passes through the breaker plate responsible for forming. This procedure ensures that, on the one hand, the material can in fact be extruded into cylindrical strands and that, on the other hand, the strands thus formed do not stick to one another or to any part of the machine immediately behind the breaker plate. The strands are broken up in the following cooling unit.

It has surprisingly been found that, in this way, it is possible to obtain a cylindrical granulate which is distinguished by the absence of any dust. This is crucially important if the material is to be further processed without pollution of the environment. The process according to the invention is also particularly suitable for slowly crystallizing organic substances or for organic substances which form melts having a pronounced tendency towards supper cooling. The residence times required for crystallization are considerably shorter by comparison with the conventional crystallizing belt. Particular emphasis is placed on the fact that the cylindrical granulate thus produced may be mixed without difficulty into rubber mixtures. Thus, the time required to homogenise the cylindrical granulate, for example, in a rubber mixture, under otherwise the same conditions for the benzothiazyl-2-sulfene morpholide used as vulcanisation accelerator is only one third to one fifth of the time required where the same material is used, but in the form of granulates produced by the pelletising processes just described.

The process according to the invention is particularly suitable for granulating sulfenamides or sulfenimides of cyclic acetals, particularly those containing unsaturated groups and aromatic amines. The process according to the invention has proved to be particularly effective for directly producing the high-melting form of benzothiazyl-2-sulfenyl morpholide which is polymorphous and occurs in two different forms having melting points of 72° C. and 84° C., respectively. In the hitherto used processes, the low-melting form is always initially formed from the melt, changing exothermically into the high-melting form over a period of up to 15 hours at 72° C. or over a period of up to 30 days at 15° C. (see also J. Heterocyclic Chem. 15, 1531 (1978)). The heat of rearrangement can produce high and damaging temperatures in the material, capable of giving rise to decomposition and agglomeration. In this case, direct production of the high-melting form means greater safety in storage and the elimination of otherwise essential waiting times pending rearrangement.

Another advantage of the process according to the invention is the fact that is is possible for solid or even liquid additives, such as waxes, resins, oils or kaolin, etc. to be directly introduced into the crystallization screw by means of suitable metering units. The resulting homogeneous mixture in the form of a cylindrical granulate has all the advantages of the pure substance, such as freedom from dust, ready further processibility and meterability.

BRIEF DESCRIPTION OF THE DRAWING

The FIGURE illustrates in outline form an apparatus suitable for practice of this invention including a series arrangement of a twin screw extruder and a single screw after cooling unit.

Examples of particular embodiments of the invention are described in detail in the following. The accompanying drawing shows an apparatus suitable for carrying out the process according to the invention. The melt 1 flows into a self-cleaning twin screw 2 rotating in the same direction and having an outer screw diameter of 32 mm, a processing length of 1100 mm and a heat exchange surface of 0.17 m². The screw is equipped with cooling jackets 3, 4, 5 and 6 designed to be tempered at different temperatures. A heatable breaker plate 7 is mounted at the product discharge end. The crystallization process takes place as the material passes through the screw. On leaving the breaker plate, from 95 to 99.5% of the material has crystallized. The small residue of melt is necessary to provide the material with the plasticity required for extrusion. The breaker plate 7 is tempered to prevent the perforations from becoming blocked by crystals. The temperature of the breaker plate is preferably kept about 20° C. above or below the melting temperature of the product. Excessively high temperatures of the breaker plate result in insipient fusion and hence blocking of the strands.

In contrast to the crystallization screws hitherto used where the screw is mounted outside the processing section, the screws of the apparatus according to the invention end just (0 to 5 mm) in front of the breaker plate. In this way, the gap between the end of the screw and the breaker plate is kept small which is essential for friction-free operation. On account of the breaker plate 7 mounted at the output end of the screw, the screws have to be mounted in the processing section. The cooling medium for the screw is introduced into the screw through the distributing unit (not shown).

The strands 8 issuing from the breaker plate 7 are cooled and size-reduced in a following single screw 9 (cooling jacket 10). The finished, storable granulate 11 emerges from the end of this single screw 9.

The degree of crystallization of the product by the time it passes through the breaker plate 7, which is critical to granulate formation, is adjusted through the cooling temperatures in the cooling zones 3, 4, 5 and 6 and through the screw speed. To this end, the coolant temperatures in zones 3, 4, 5 and 6 are initially set at a level above the melting point of the material. The rotational speed of the screw is adjusted such that, for a given throughput, there is, on the one hand, no build up of product at the inlet end of the extruder whilst, on the other hand, the threads of the screw at almost completely filled with the melt. If the rotational speed of the screw were too high, the heat exchange surfaces available in the machine would be inadequately utilized. The coolant temperature of zones 3, 4, 5 and 6 is then reduced to such an extent that the degree of crystallization of the strands 8 issuing from the extruder is between 70% and 99.5%. This also ensures that the strands 8 no longer adhere to one another. The following emperical procedure is used for determining the degree of crystallization:

The temperature of the cylindrical granulate 8 immediately it has issued from the breaker plate 7 is measured from outside (always in the equilibrium state) by means of a thermosensor. The temperature of the cylindrical granulate, which has been allowed to trickle in a sufficient quantity into a Dewar vessel, is measured simultaneously. The crystallization process is completed in the Dewar vessel. The process has ceased when there is no further increase in temperature. Knowing the heat of crystallization and the specific heat, it is possible to calculate the percentage crystallized in the Dewar vessel from the difference in temperature which amounts to between 0.5° C. and 15° C., depending on the substance. Corresponding to the above-mentioned range from 70% to 99.5% for the degree of crystallization, this percentage that lie between 30% and 0.5%.

The product strands 8 issuing from the breaker plate are broken up in the after-cooling unit (single screw 9). A cylindrical granulate is formed, having substantially the same cross-section and lengths which on average are 10 times the diameter of the cylindrical granulates. The cross-section of the strands is determined by the perforations in the breaker plate 7 and is also influenced by the pressure difference between the pressure head of the breaker plate 7 and the atmospheric pressure prevailing behind the breaker plate and also by the cooling of the strands in the after-cooling unit 9. The pressure difference causes the strands to expand whilst the cooling effect causes them to contract. The differences between the diameter of the strands and the perforation diameter of the breaker plate are as much as ±20%. The cylindrical granulate should preferably have a circular cross section with a diameter of the order of 2.5 mm.

Cylindrical granulates are composed of numerous small particles with bridges between the particles being formed by the fully crystallized residual melt. The particles range from 0.1 to 50 μm in diameter.

The properties of the product (absence of dust, transportability and ready miscibility) may be influenced by the operating parameters, the screw speed and the coolant temperature. A relatively high percentage of residual melt increases bridge formation and hence improves transportability, but has an adverse effect upon miscibility. Relatively high screw speeds reduce the diameter of the particles and thus improve their miscibility.

EXAMPLE 1

| Product: | Diisooctyldiphenylamine |
|---|---|
| Breaker plate- | |
| perforation diameter: | 1.5 mm |
| number of perforations: | 10 |
| Screw speed: | 50 min$^{-1}$ |
| Product input temperature: | 115° C. |
| Cooling zones: | |
| 3 and 4 | 110° C. |
| 5 and 6 | 35° C. |
| Product output temperature: | 65° C. |
| Throughput: | 17 Kg/h |
| Temperature of the breaker plate: | 70° C. |

EXAMPLE 2

| Product: | Benzothiazyl-2-sulfenyl morpholide |
|---|---|
| Breaker plate- | |
| perforation diameter: | 1.5 mm |
| number of perforations: | 10 |
| Screw speed: | 35 min$^{-1}$ |
| Product input temperature: | 102° C. |
| Cooling zones: | |
| 3 and 4 | 100° C. |
| 5 and 6 | 20° C. |
| Product output temperature: | 72° C. |
| Throughput: | 15 kg/h |
| Temperature of the breaker plate: | 78° C. |

The resulting product may be homogeneously distributer over a period of 3 minutes at 50° C. on mixing rolls in the natural rubber Defo 2000.

EXAMPLE 3

| Product: | N—(1,3-dimethylbutyl)-N'—phenyl-p-phenylene diamine) |
|---|---|
| Breaker plate- | |
| perforation diameter: | 2.5 mm |
| number of perforations: | 8 |
| Screw speed: | 30 min$^{-1}$ |
| Product input temperature | 100° C. |
| Cooling zones: | |
| 3, | 100° C. |
| 4, 5 and 6 | 15° C. |
| Product output temperature: | 37° C. |
| Throughput: | 11 kg/h |
| Temperature of the breaker plate: | 40° C. |

EXAMPLE 4

| Product: | Condensation product of 2 moles of tetrahydrobenzaldehyde & 1 mole of pentaerythritol |
|---|---|
| Breaker plate- | |
| perforation diameter: | 2.5 mm |
| number of perforations: | 10 |
| Screw speed: | 35 min$^{-1}$ |
| Product input temperature: | 110° C. |
| Cooling zones: | |

| | |
|---|---|
| 3 and 4 | 104° C. |
| 5 and 6 | 16° C. |
| Product output temperature: | 63° C. |
| Throughput: | 10 kg/h |
| Temperature of the breaker plate: | 85° C. |

EXAMPLE 5

| | |
|---|---|
| Product: as described in Example 4, but with 20% of Antilux 500 wax | |
| Breaker plate- | |
| perforation diameter: | 2.5 mm |
| number of perforations: | 10 |
| Screw speed: | 35 min$^{-1}$ |
| Product input temperature: | 105° C. |
| Cooling zones: | |
| 3 and 4 | 106° C. |
| 5 and 6 | 16° C. |
| Product output temperature: | 65° C. |
| Throughput: | 15 kg/h |
| Temperature of the breaker plate: | 80° C. |

EXAMPLE 6

| | |
|---|---|
| Product: as described in Example 4, but with 50% of kaolin powder | |
| Breaker plate- | |
| perforation diameter: | 2.5 mm |
| number of perforations: | 10 |
| Screw speed: | 90 min$^{-1}$ |
| Product input temperature: | 110° C. |
| Cooling zones: | |
| 3 and 4 | 110° C. |
| 5 and 6 | 50° C. |
| Product output temperature: | 60° C. |
| Throughput: | 15 kg/h |
| Temperature of the breaker plate: | 75° C. |

EXAMPLE 7

| | |
|---|---|
| Product: | Cyclohexylthiophthalimide |
| Breaker plate- | |
| perforation diameter: | 2.5 mm |
| number of perforations: | 5 |
| Screw speed: | 50 min$^{-1}$ |
| Product input temperature: | 110° C. |
| Cooling zones: | |
| 3 and 4 | 110° C. |
| 5, | 16° C. |
| 6 | 55° C. |
| Product output temperature: | 80° C. |
| Throughput: | 10 kg/h |
| Temperature of the breaker plate: | 90° C. |

We claim:

1. A process for the production of granulates of crystallizable organic substances from a melt comprising low-temperature crystalization of the melt in a twin-screw extruder, extrusion through a breaker plate at the end of the extruder and subsequent cooling of the extruded product, further comprising adjusting the temperature prevailing in the screw extruder, adjusting the twin screw rotational speed and adjusting the temperature of the breaker plate to produce crystallization of from 70% to 99.5% of the organic substances by the time it reaches the end of the twin screw, and crystallizing the remainder in a subsequent cooling operation.

2. A process as claimed in claim 1, characterized in that the breaker plate is maintained at a temperature approximately 20° C. above or below the melting temperature of the product.

3. A process as claimed in claim 1 or 2, characterized in that solid or liquid additives are introduced into the crystallization screw.

4. A process as claimed in claim 3 wherein the organic substance to be granulated is a melt comprising sulfenamides or sulfenimides.

5. A process as claimed in claim 3 wherein the organic substance to be granulated is a melt comprising a cyclic acetal.

6. A process as claimed in claim 3 wherein the organic substance to be granulated is a melt comprising aromatic amines.

7. A process as claimed in claim 3 wherein the organic substance to be granulated is a melt of benzothiazyl-2-sulfenyl morpholide.

* * * * *